US012568093B2

(12) United States Patent
Yang et al.

(10) Patent No.: US 12,568,093 B2
(45) Date of Patent: *Mar. 3, 2026

(54) METHODS AND SYSTEMS TO IDENTIFY A COMPROMISED DEVICE THROUGH ACTIVE TESTING

(71) Applicant: BlackBerry Limited, Waterloo (CA)

(72) Inventors: Chang Fung Yang, Mississauga (CA); Robert Joseph Lombardi, Kitchener (CA); Chi Hing Ng, Richmond Hill (CA); Johnathan George White, St. Albans (GB)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/183,220

(22) Filed: Mar. 14, 2023

(65) Prior Publication Data

US 2023/0224307 A1     Jul. 13, 2023

Related U.S. Application Data

(63) Continuation of application No. 16/541,672, filed on Aug. 15, 2019, now Pat. No. 11,632,377.

(51) Int. Cl.
H04L 9/40        (2022.01)
G06F 16/13       (2019.01)
(Continued)

(52) U.S. Cl.
CPC .............. H04L 63/12 (2013.01); G06F 16/13 (2019.01); G06F 16/168 (2019.01);
(Continued)

(58) Field of Classification Search
CPC ........ H04L 63/12; H04L 63/14; H04W 12/30; G06F 16/168
(Continued)

(56) References Cited

U.S. PATENT DOCUMENTS 8,370,362 B2    2/2013   Szabo
10,038,711 B1    7/2018   Gorodissky et al.
(Continued)

FOREIGN PATENT DOCUMENTS

WO        2015187716       12/2015
WO        2018104799        6/2018

OTHER PUBLICATIONS

USPTO: US Office Action relating to U.S. Appl. No. 18/163,190 dated Jun. 8, 2023.
(Continued)

*Primary Examiner* — Chuck Huynh
(74) *Attorney, Agent, or Firm* — Conley Rose, P.C.; J. Robert Brown, Jr.

(57)        ABSTRACT

Methods and devices for determining whether a mobile device has been compromised. File tree structure information for the mobile device is obtained that details at least a portion of a tree-based structure of folders and files in a portion of memory. The file tree structure information is analyzed to determine that the mobile device has been compromised, has not been compromised, or might be compromised. Based on determining that the mobile device might be compromised, the mobile device is instructed to execute a restricted action. If the restricted action occurs on the mobile device then it is determined that the mobile device has been compromised. Based on that determination, an action is taken.

20 Claims, 9 Drawing Sheets

(51) Int. Cl.

| | |
|---|---|
| *G06F 16/16* | (2019.01) |
| *G06F 21/12* | (2013.01) |
| *G06F 21/62* | (2013.01) |
| *H04L 67/06* | (2022.01) |
| *H04L 67/306* | (2022.01) |
| *H04W 12/30* | (2021.01) |

(52) U.S. Cl.
CPC ........ *G06F 21/121* (2013.01); *G06F 21/6218* (2013.01); *H04L 67/06* (2013.01); *H04L 67/306* (2013.01); *H04W 12/30* (2021.01)

(58) Field of Classification Search
USPC ......................................................... 455/411
See application file for complete search history.

(56) References Cited

U.S. PATENT DOCUMENTS

| | | | |
|---|---|---|---|
| 10,250,588 B1 | 4/2019 | Tarafdar et al. | |
| 10,440,044 B1 | 10/2019 | Zini et al. | |
| 10,469,521 B1 | 11/2019 | Segal et al. | |
| 10,769,277 B2 * | 9/2020 | Branson | G06F 21/566 |
| 10,880,326 B1 | 12/2020 | Gofman | |
| 11,632,377 B2 * | 4/2023 | Yang | G06F 21/6218 |
| | | | 455/411 |
| 2008/0195676 A1 | 8/2008 | Lyon et al. | |
| 2010/0250509 A1 | 9/2010 | Andersen | |
| 2010/0262584 A1 | 10/2010 | Turbin et al. | |
| 2013/0185800 A1 | 7/2013 | Miller et al. | |
| 2013/0333033 A1 | 12/2013 | Khesin | |
| 2014/0040630 A1 | 2/2014 | Swaminathan | |
| 2014/0289733 A1 * | 9/2014 | Fritz | G06F 9/5066 |
| | | | 718/104 |
| 2014/0317734 A1 | 10/2014 | Valencia et al. | |
| 2014/0344922 A1 * | 11/2014 | Lam | H04W 12/08 |
| | | | 726/19 |
| 2017/0147827 A1 * | 5/2017 | Bowers | G06F 21/577 |
| 2017/0235966 A1 | 8/2017 | Ray | |
| 2019/0098037 A1 | 3/2019 | Shenoy | |
| 2019/0332576 A1 | 10/2019 | Godman | |
| 2019/0394221 A1 * | 12/2019 | Xiao | G06F 16/16 |
| 2021/0165969 A1 | 6/2021 | Galitsky | |

OTHER PUBLICATIONS

Extended European Search Report, Application No. EP20186204 Dec. 16, 2020.

USPTO: US Office Action relating to U.S. Appl. No. 16/541,795, dated Mar. 23, 2022.

USPTO: US Office Action relating to U.S. Appl. No. 16/541,630, dated Nov. 5, 2021.

USPTO: Advisory Action related to U.S. Appl. No. 16/541,630 dated May 4, 2022.

USPTO: US Office Action relating to U.S. Appl. No. 16/541,630 dated Jun. 3, 2022.

US Notice of Allowance, U.S. Appl. No. 16/541,672 dated Dec. 14, 2022.

US Notice of Allowance, U.S. Appl. No. 16/541,795 dated Sep. 9, 2022.

US Final Office Action, U.S. Appl. No. 16/541,672 dated Sep. 28, 2022.

2nd US Notice of Allowance, U.S. Appl. No. 16/541,795 dated Oct. 31, 2022.

US Office Action, U.S. Appl. No. 16/541,672, filed Mar. 15, 2022.

US Final Office Action, U.S. Appl. No. 16/541,672 dated Oct. 8, 2021.

US Office Action, U.S. Appl. No. 16/541,735, filed Aug. 16, 2021.

US Office Action, U.S. Appl. No. 16/541,672, filed Jun. 23, 2021.

USPTO: Advisory Action relating to U.S. Appl. No. 16/541,672, dated Dec. 22, 2020.

USPTO: US Final Office Action relating to U.S. Appl. No. 16/541,672, dated Sep. 17, 2020.

US Office Action, U.S. Appl. No. 16/541,672, filed Mar. 6, 2020.

Extended European Search Report—EP23192757.5 Nov. 24, 2023.

Michael Witt et al: "Sandboxing of biomedical applications in Linux containers based on system call evaluation", Concurrency and Computation: Practice and Experience, Wiley, London, GB, vol. 30, No. 12, Apr. 25, 2018 (Apr. 25, 2018), p. n/a, XP072307279, ISSN: 1532-0626, DOI: 10.1002/CPE.4484.

Shao Yuru et al: "RootGuard: Protecting Rooted Android Phones", IEEE Computer Society, IEEE, USA, vol. 47, No. 6, Jun. 1, 2014 (Jun. 1, 2014), pp. 32-40, XP011551335, ISSN: 0018-9162, DOI: 10.1109/MC.2014.163 [retrieved on Jun. 18, 2014].

* cited by examiner

100

600

602 Obtain file tree structure information for a computing device

604 Determine from file tree structure information whether device is likely compromised 606 Compromised?

608 Ouptut notification

No

Yes

610 Take an action

700

Obtain file tree structure information for a managed profile on a computing device — 702

Analyzing the file tree structure information in comparison to a device model for a managed device — 704

706

Ouptut notification

No

Compromised?

Yes

Take an action

708

710

800

Obtain file tree structure
information for an unmanaged
profile on a computing device

802

Analyzing the file tree structure
information in comparison to a
device model for an unmanaged
device

804

806

No          Compromised?          Yes

Ouptut notification

Take an action

808

810

900

METHODS AND SYSTEMS TO IDENTIFY A COMPROMISED DEVICE THROUGH ACTIVE TESTING

CROSS-REFERENCE TO RELATED APPLICATIONS

The present application is a continuation of U.S. patent application Ser. No. 16/541,672 entitled "METHODS AND SYSTEMS TO IDENTIFY A COMPROMISED DEVICE THROUGH ACTIVE TESTING" filed Aug. 15, 2019, the contents of which are hereby incorporated by reference.

FIELD

The present application generally relates to data security, and more particularly, to identifying whether an electronic device has been rooted.

BACKGROUND

Computing devices may contain sensitive information. In some cases, a computing device may be include different profiles or accounts to isolate information or data associated one account from access by other profiles or accounts on the same device.

In some cases, computing devices may become intentionally or unintentionally compromised. This is sometimes referred to as the device being "rooted" or "jailbroken". This may allow for access to files or folder or file system operations that should not be permitted for security reasons. It would be advantageous to be able to quickly and accurately determine whether a computing device has been compromised.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
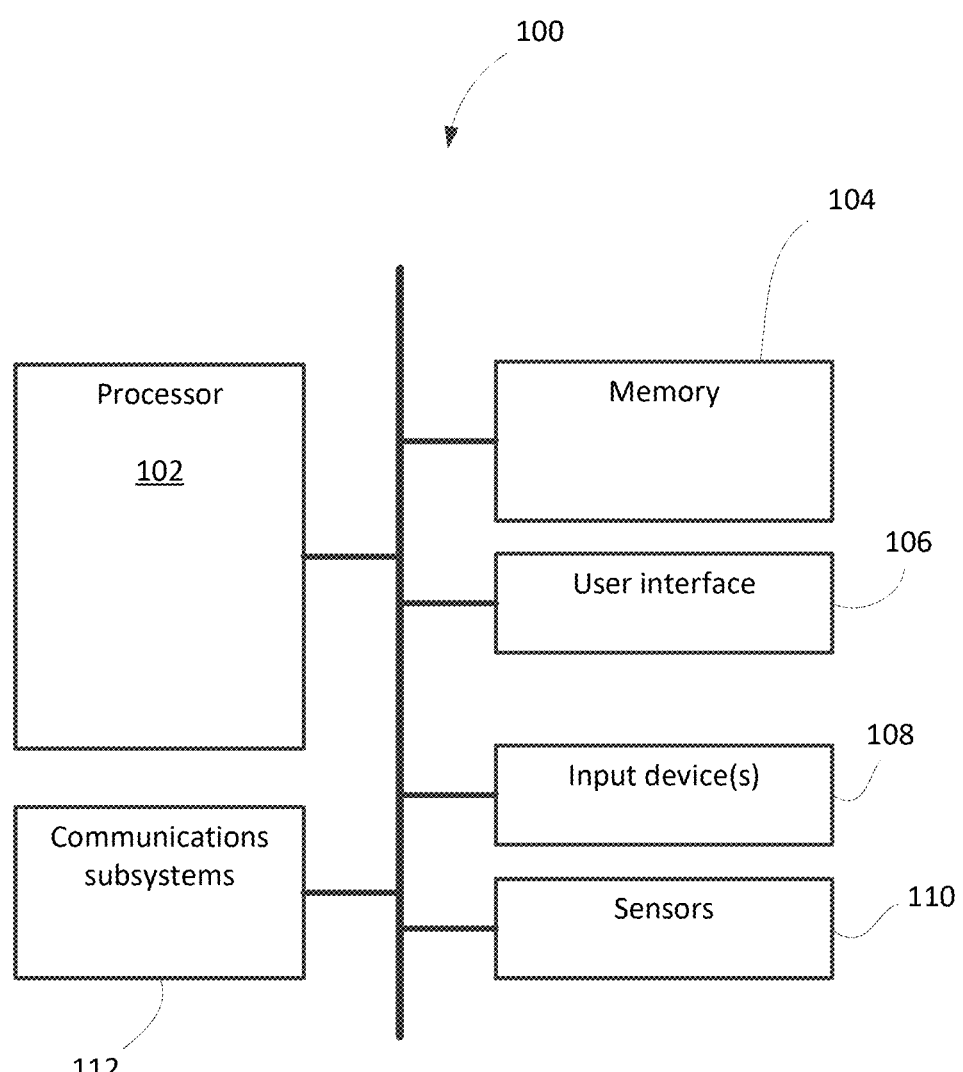
FIG. 1 shows, in block diagram form, a simplified example of a computing device.

In a first aspect, the present application describes a computer-implemented method of determining whether a computing device has been compromised. The method may include obtaining file tree structure information for the computing device, wherein the file tree structure information details at least a portion of a tree-based structure of folders and files in a memory on the computing device; determining from the file tree structure information that the computing device is compromised; and based on the determination that the computing device has been compromised, taking an action.

In another aspect, the present application describes a computer-implemented method of determining whether a mobile device has been compromised, the mobile device having an internal storage that includes a managed portion of memory and an unmanaged portion of memory, the mobile device having a managed profile and an unmanaged profile, wherein the managed profile includes files stored in the managed portion of memory and the unmanaged profile includes files stored in the unmanaged portion of memory, and wherein the managed profile is governed by a device policy set by a remote administrator. The method may include obtaining file tree structure information for the unmanaged profile of the mobile device, wherein the file tree structure information details at least a portion of a tree-based structure of folders and files in the unmanaged portion of memory; determining from the file tree structure information that the mobile device has been compromised; and based on the determination that the mobile device has been compromised, taking an action.

In yet another aspect, the present application describes a computer-implemented method of determining whether a mobile device has been compromised, the mobile device having an internal storage that includes a managed portion of memory and an unmanaged portion of memory, the mobile device having a managed profile and an unmanaged profile, wherein the managed profile includes files stored in the managed portion of memory and the unmanaged profile includes files stored in the unmanaged portion of memory, and wherein the managed profile is governed by a device policy set by a remote administrator. The method may include obtaining file tree structure information for the managed profile of the mobile device, wherein the file tree structure information details at least a portion of a tree-based structure of folders and files in the managed portion of memory; determining from the file tree structure information that the mobile device has been compromised; and based on the determination that the mobile device has been compromised, taking an action.

In yet a further aspect, the present application describes a computer-implemented method of determining whether a mobile device has been compromised. The method may include obtaining file tree structure information for the mobile device, wherein the file tree structure information details at least a portion of a tree-based structure of folders and files in a portion of memory; analyzing the file tree structure information to determine that the mobile device has been compromised, has not been compromised, or might be compromised; based on determining that the mobile device might be compromised, instructing the mobile device to execute a restricted action; determining that the restricted action occurs on the mobile device and, based on that occurrence, determining that the mobile device has been compromised; and based on the determination that the mobile device has been compromised, taking an action.

In some implementations, file tree structure information may include permissions associated with folders and files in the portion of the tree-based structure. In some such implementations, determining may include identifying a match between a permission setting of a file or folder on the computing device and a compromised permission setting for that file or folder in a model. In some cases, determining may include identifying a difference between a permission setting of a file or folder on the computing device and an expected permission setting for that file or folder prescribed by an uncompromised device model.

In some implementations, determining may include determining that a file or folder within a privileged memory space is accessible.

In some implementations, a model may prescribe an expected tree-based structure of an uncompromised device and determining may include identifying a deviation between the portion of the tree-based structure and the expected tree-based structure. In some cases, one or more models may prescribe expected tree-based structures of compromised devices and determining may include matching the portion of the tree-based structure to one of the expected tree-based structures.

In some implementations, the portion of the tree-based structure may exclude user-specific folders.

In some implementations, taking an action may include one or more of: sending a message to a remote device regarding the compromised computing device, wiping the memory of the computing device, storing in memory information regarding the compromised computing device, disabling the computing device, or changing settings at an enterprise network to deny access to the computing device.

In some implementations, the restricted action may include writing to a restricted portion of memory on the mobile device, or copying a file from a restricted portion of memory on the mobile device, or causing an executable to run.

In some implementations, the mobile device may include at least a first user profile and a second user profile, the first user profile having a first associated portion of memory storing files and folders associated with the first user profile and the second user profile having a second associated portion of memory storing files and folder associated with the second user, and the restricted action may include an operation carried out from within the first user profile with respect to a file or folder associated with the second user profile.

In some implementations, instructing the mobile device may include automatically causing input of a command line instruction at the mobile device.

In some implementations, the obtaining and analyzing may be carried out by a remote server in communication with the mobile device. In some such cases, the mobile device may include a reporting agent from which the remote server obtains the file tree structure information and which carries out the instructing of the mobile device.

In yet a further aspect, the present application describes a non-transitory computer-readable storage medium storing processor-readable instructions that, when executed, configure a processor to perform any of the methods described herein. Also described in the present application is a computing device comprising: a processor, memory, and an application containing processor-executable instructions that, when executed, cause the processor to carry out at least one of the methods described herein. In this respect, the term processor is intended to include all types of processing circuits or chips capable of executing program instructions.

Other aspects and features of the present application will be understood by those of ordinary skill in the art from a review of the following description of examples in conjunction with the accompanying figures.

In the present application, the terms "about", "approximately", and "substantially" are meant to cover variations that may exist in the upper and lower limits of the ranges of values, such as variations in properties, parameters, and dimensions. In a non-limiting example, the terms "about", "approximately", and "substantially" may mean plus or minus 10 percent or less.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application reference may be made to determining whether a computing device is "compromised". Other references may be made to whether a device is "rooted" or "jailbroken". These terms all refer to conditions in which a device has been modified or altered to provide the ability to perform operations that are otherwise prevented on the device. For example, "rooting" typically refers to obtaining "root user" or "super-user" administrator-level permissions that are normally inaccessible to a device user or owner. These permissions may permit functions or operations on the device that would normally not be permitted by the operating system, possibly including removing or replacing the operating system itself. The term "jailbreaking" may refer to bypassing prohibitions without necessarily obtaining root user access, and may include side-loading applications not normally available for download and use on the device or gaining elevated administrative-level permissions (which may or may not include root user access). In general, a "compromised" device refers to a device that has been modified in a manner not permitted by the device manufacturer, the operating system provider, the carrier, and/or an enterprise that manages the device.

A device may be compromised intentionally or unintentionally. In some cases, a user may intentionally compromise a device to make modifications to its operating system or other device features or to side-load applications that are not approved for use on the device. In some cases, a device may be unintentionally compromised through the user's unwitting installation and operation of malware, spyware, computer viruses, or the like.

In the present application reference is made to a "file tree structure". A file tree structure refers to a tree-based relationship between folders and files in a memory. In many file systems, folders may contain files or other folders, i.e. sub-folders. In some file systems, folders may be referred to as "containers", "directories", or using some other equivalent term. "Files" in this context refer to applications, data files, resources files, executables, media files, or any other type of file. In this context, "file tree structure information" refers to information regarding the folders and files in at least a part of a file system, and may include the names of the files and folders, their relationship to each other, and information associated with the files and/or folders, such as permissions or other metadata. In some cases the file tree structure information is a list of files and folders from within a certain user account having a set of user permissions. The list may include names of the files and folder, path information that indicates the hierarchical relationship of folders, sub-folders and files, and associated permission information.

The term "memory" used above in connection with a file tree structure may refer to persistent and/or volatile memory. Files may be transient files in some cases.

Many organizations have gravitated to a bring-your-own-device (BYOD) model for staff mobile computing devices. To facilitate this model, many organization use a enterprise mobility management (EMM) solution to exercise enterprise control over computing devices and resources that may be accessed by computing devices. The EMM solution may include Mobile Application Management (MAM), which is a specific control over a specific application or set of applications. This type of EMM involves controlling applications and their capabilities on the computing devices, but not necessarily device-layer control over the computing devices. The EMM solution may alternatively or additionally include a Mobile Device Management (MDM) solution, which is where the enterprise is capable of managing an entire endpoint device or profile on an endpoint device. This may enable more significant control over a device and its operations. Some EMM solutions involve a mix of MAM and MDM features. In general, the EMM may govern the ability of mobile computing devices to access an enterprise network and may enable the enterprise to push device policies and security policies to the mobile computing devices. In many cases, the model is mixed and involves some devices brought to the enterprise under a BYOD policy and some devices, particularly enterprise desktops, laptops, and other such computing devices, that are enterprise-owned but are in the possession and control of staff users. The security of both these types of computing devices is of concern to enterprises and to users. Accordingly, it may be advantageous to have an improved method and system for determining whether a computing device has been compromised.

Although many of the example computing devices described and discussed below are mobile devices, such as smartphones, tablets, and laptops, the present application is not limited to mobile devices and may be implemented in connection with non-mobile devices.

In one aspect, the present application describes a system and method of identifying a compromised device based on the device's file tree structure. Compromising a device through jailbreaking or rooting may leave tell-tale evidence in changes to the file tree structure, meaning that an analysis of the file tree structure may enable identification of likely compromised devices. A device model or rule set may be provided for the purpose of analyzing a device's file tree structure information to identify whether it has any indicia of a likely device compromise. An anomaly in a device's file tree structure information may be associated with likely compromised devices. Permissions associated with folder and/or files within the file tree structure may be useful as indicia of a potentially compromised device.

In some instances, machine learning and/or artificial intelligence may be used to help develop the device model or rule set based on training data from a large set of compromised and uncompromised devices. The device model may be part of a continuous improvement process, in which the device model is continually refined during use. As will be described below, the device model may be present on the actual device being evaluated, or may be located on a remote server which is conducting an evaluation of an actual device.

Reference is now made to FIG. 1, which shows, in block diagram form, a simplified example of a computing device 100. The computing device 100 includes a processor 102, memory 104, a user interface 106, and one or more input devices 108. The memory 104 may include temporary memory and persistent memory. The user interface 106 may include a display screen in many embodiments, but may also include other sensory output devices including a speaker, vibratory mechanism, e-ink display, or other such devices. The input devices 108 may include a touch-sensitive input device like a touchscreen, a keyboard, a keypad, a camera, a microphone, a gyroscope, an accelerometer, and various other input mechanisms.

The computing device 100 may further include various sensors 110, some of which may be input devices 108, and one or more communications subsystems 112. The communications subsystems 112 enable wired or wireless communication with other computing devices. Example communication subsystems 112 include a cellular system for data and/or voice communication over a cellular network, including 3G, 4G or 5G networks, a WiFi chip for data connection with a wireless local area network (WLAN), a short-range wireless system like a Bluetooth™ chip, a near-field communications (NFC) chip, an Ethernet port, or any other communications systems operating in accordance with any applicable communications protocol.

Figure 2:
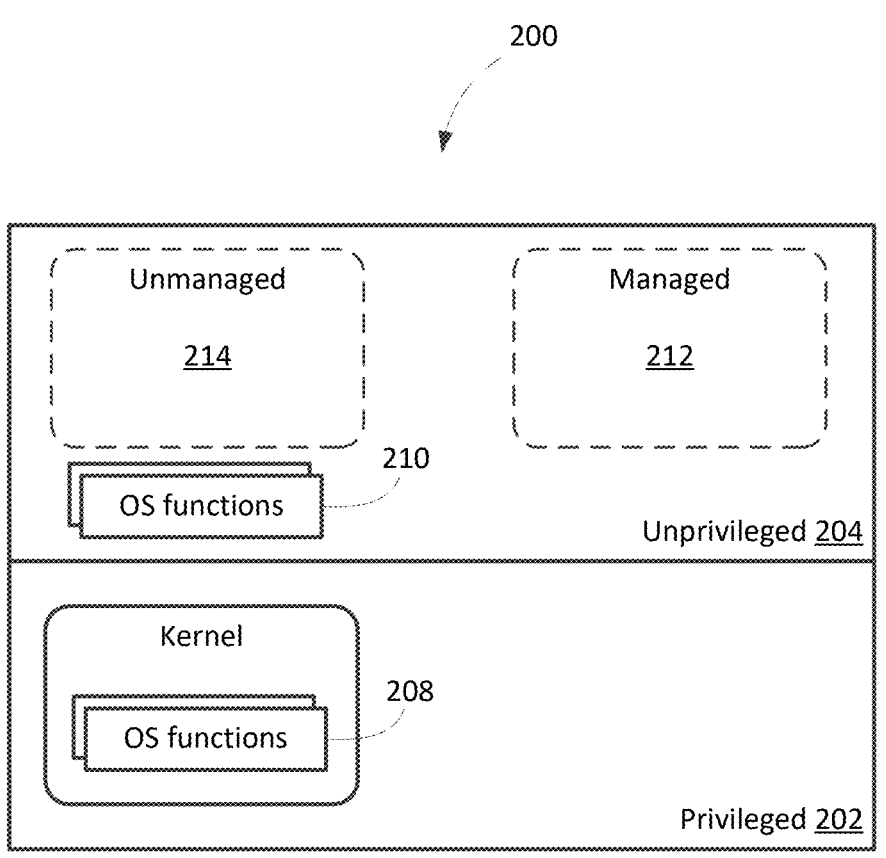
FIG. 2 shows another simplified example of a computing device.

Reference is now made to FIG. 2, which illustrates a simplified example of a computing device 200. The device 200 may include a privileged space 202 and an unprivileged space 204. The privileged space 202 of the device 200 generally refers to a secure and protected portion of memory that cannot be accessed except by processes having sufficient authorization or permissions. Core processes, such as some or all of the operating system for the computing device 200 may operate in the privileged space 202. In this example, the operating system includes a kernel 206, which provides operating system (OS) functions 208, such as address management and inter-process communications. The kernel 206 may operate in the privileged space 202. In some implementations, some OS functions 210 may be provided by code operating in the unprivileged space 204, such as in the case of a microkernel implementation. The unprivileged space 204 may be referred to as "user space" in some cases.

The unprivileged space 204 may also be associated with a portion of memory accessible to the user and the operating system. User data, applications, resources, and other files may be stored in memory within the unprivileged space 204. In general the file tree structure may be located in the unprivileged space 204. In some implementations, depending on the nature of the operating system architecture and depending upon the permissions of the user account from which the file tree structure is viewed, some of the visible file tree structure may be located in, or associated with, privileged space 202 in memory.

The computing device 200 may include an unmanaged profile 214. The unmanaged profile 214 may, in many cases, include an initial device user profile. The unmanaged profile 214 may include administrator privileges and may enable the creation, modification, and deletion of other user profiles. Additional unmanaged profiles associated with other users of the device may also be provided for on the computing device 200 in some implementations. In some instances, the unmanaged profile 214 may be referred to as a "personal profile" or "personal account".

In this example, the computing device 200 further includes a managed profile 212. The managed profile 212 is a user profile created for the purpose of accessing or obtaining data or resources from an enterprise network. The managed profile 212 may be referred to as a "work profile" or "work account". The managed profile 212 may include one or more policies provided by the enterprise network to restrict permissions, functions and operations within the managed profile 212 or to otherwise modify permissions and authorizations within the managed profile 212. In some cases, the managed profile 212 may include an application or other software code configured to send data to the enterprise network and, in particular, a device management server within the enterprise network, for the purpose of ensuring the device compiles with device policies. The application may send, for example, a list of applications installed on the device within the managed profile 212, since the device policy may only permit certain white-listed applications or may restrict certain black-listed applications or categories of applications.

The objective in providing for a managed profile 212 is typically to "sandbox" data and applications in the "work account" to prevent leakage of enterprise data. When the device operates within the managed profile 212, i.e. when authorization credentials have been provided to enable the managed profile 212, the applications and data within the managed profile 212 may be used. When operating from within the unmanaged profile 214, the applications and data within the managed profile 212 are not accessible. Likewise, when operating within the managed profile 212, the applications and data within the unmanaged profile 214 should be inaccessible.

In many implementations, the unmanaged profile 214 and the managed profile 212 may have distinct visible file tree structures. Some folders/directories may be visible from within either profile, but some folders/directories may only be visible to the profile having correct permissions associated with the folder/directory. Generally, access to and visibility of the file tree structure within a respective one of the profiles is limited to the folders and files for which that profile has sufficient permissions. Permissions to view, access, edit, etc., may be specified for and associated with each file and/or folder.

Figure 3:
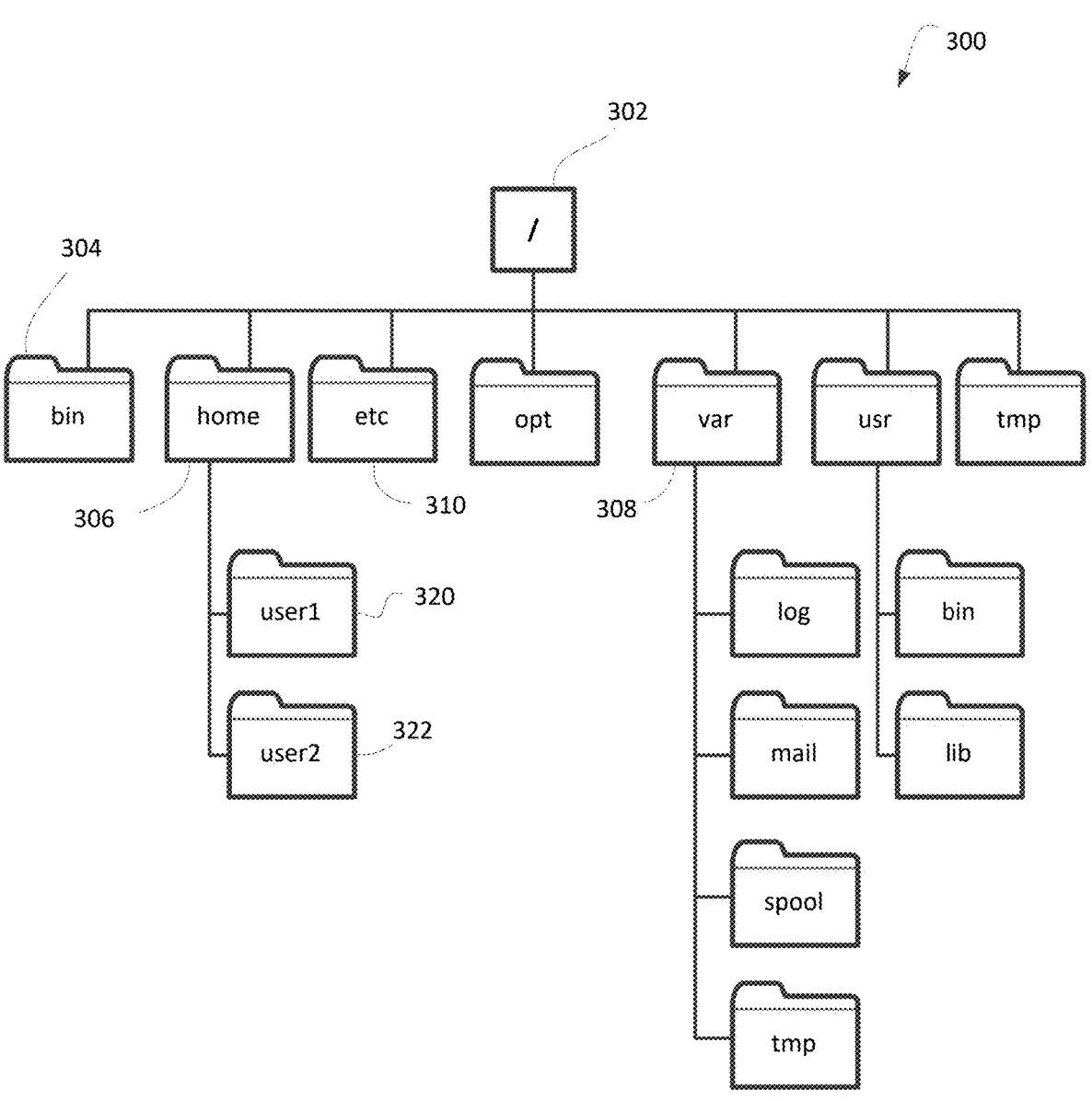
FIG. 3 shows one simplified example of a file tree structure for a computing device.

Reference is now made to FIG. 3 which shows one simplified example of a file tree structure 300. The file tree structure 300 illustrated in FIG. 3 is based on a simplified version of a Linux-based file tree structure. It will be appreciated that the Linux-based tree structure is for illustrative purposes and that the present application is not limited to any particular operating system, programing language, or specific tree structure paradigm.

The structure 300 includes a root folder or root directory 302. This is a top-level directory or node that serves as the starting point of the file system. The term "root directory" does not imply any relationship with or connection to the "root user" or permissions related to the root user. In a Linux architecture, the file system structure 300 typically contains a number of common first-level directories or folders. In Linux, these are typically referred to as "directories", but the term is equivalent to a folder or container in the sense those terms are used in connection with file systems.

The first-level directories may include, for example, a bin directory 304 that may contain basic binaries and executables, and a home directory 306 containing user-specific sub-folders. These subfolders, such as user1 320 and user2 322, for example, may include files or data specific to a user profile. Other first-level directories may include a var directory 308, which may contain variable data such as log files, or an etc directory 310 that may include system configuration files.

Some other example tree structures, for example a file tree structure based on the Android™ operating system, may include virtual folders/directories that represent allocated memory space that the kernel uses to store information regarding the system and its operation. In the Android™ operating system example, this directory is often labelled the "/proc" filesystem, and will appear to have a path such as "/proc/ . . . ". In some cases, sub-directories may be generated with regard to ongoing and active processes. For example, sub-directories may be generated for active threads or processes.

Although the files and folders are illustrated in a tree structure, albeit in simplified form, and are referred to as a file tree structure, it will be appreciated that in many implementations data regarding a filesystem or file tree structure may be obtained in list format. For example, information regarding a file tree structure may include a listing of visible files/folders. Each listing may include a pathname for each folder and/or file and associated permissions for that folder and/or file.

Using the example of a Linux system, a command such as "ls" may be used to obtain a listing of visible files and directories. With certain modifiers, such as "ls-1", additional details may be obtained such as a listing of files and directories with their associated "owner" and permissions. Additional or alternative modifiers may be used to obtain other listings of files and folders.

Any references herein to a file tree structure or information regarding a file tree structure include listings of files and folders, their pathnames, and their respective associated permissions.

Figure 4:
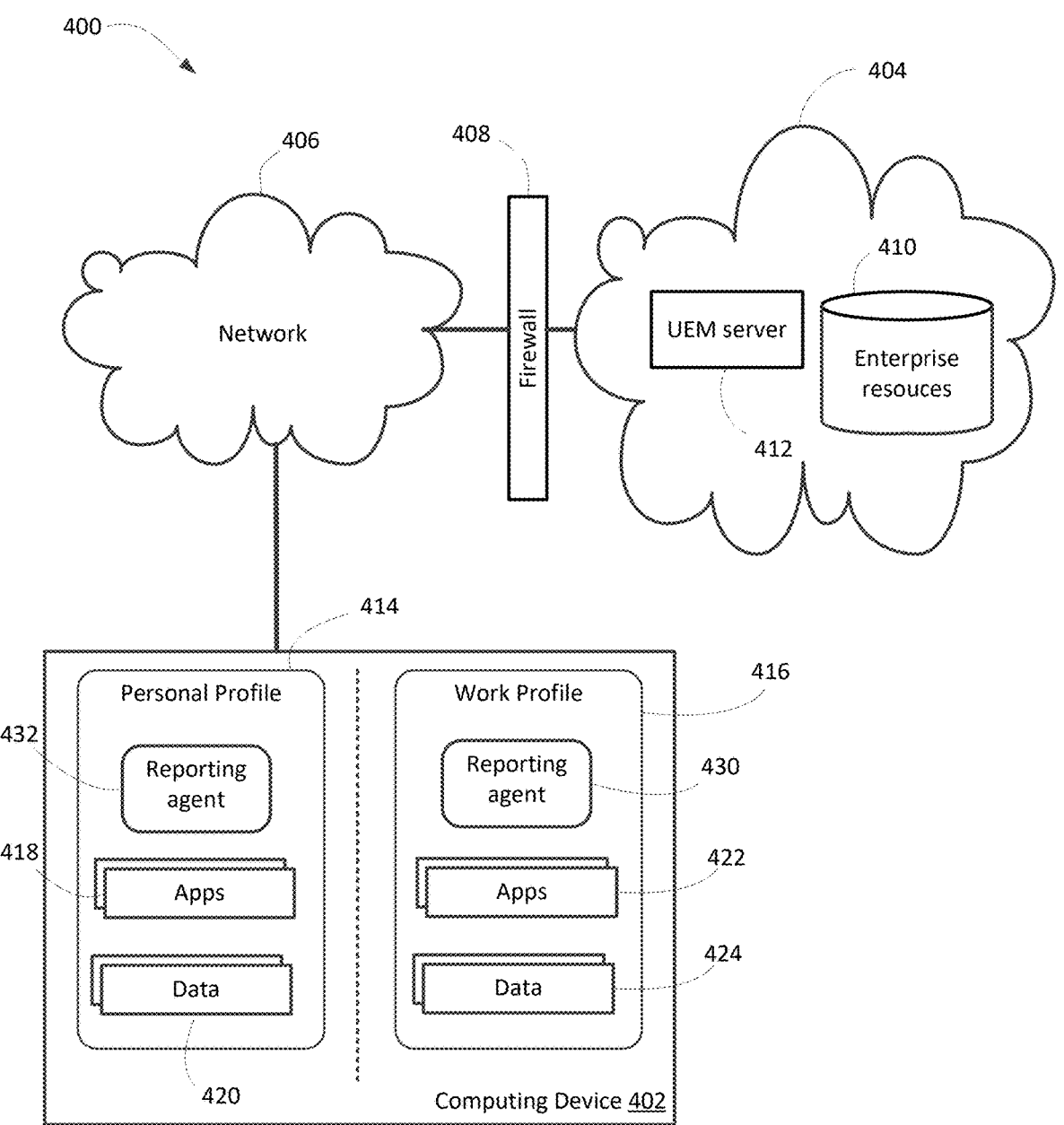
FIG. 4 shows an example system in which methods and devices in accordance with the present description may be implemented.

Reference is now made to FIG. 4, which shows an example system 400 in which methods and devices in accordance with the present description may be implemented. The system 400 includes a computing device 402 and an enterprise network 404. The computing device 402 is configured to communicate with the enterprise network 404 via a computer network 406. The computer network 406 may include wired networks, wireless networks, or combinations thereof, and may include the Internet. The enterprise network 404 may include security mechanisms regulating access and traffic between the enterprise network 404 and the computer network 406, represented generally as a firewall 408 in FIG. 4. In this example, the computing device 402 may be a mobile device, such as a smartphone, smartwatch, laptop, tablet, wearable, or other such device.

The enterprise network 404 may include enterprise resources 410, which may include one or more servers, including application servers, web servers, databases or other such resources. The enterprise resources 410 may also include data resources, such as media libraries, file repositories, app databases, or other such resources.

The enterprise network 404 in this example may also include a unified endpoint management (UEM) server 412. The UEM server 412 may be configured to manage remote mobile devices associated with the enterprise as part of an EMM solution. The remote mobile devices may include devices owned by the enterprise or owned by a staff member of the enterprise and associated through a BYOD program. The UEM server 412 may manage the remote mobile devices by establishing device policies governing device use and permissions. The device policies may restrict applications that are permitted on the remote mobile devices and/or require certain permission settings in connection with certain applications. The remote mobile devices may be configured to provide information regarding installed applications to the UEM server 412 automatically or on request. The UEM server 412 may enable geo-tracking of the remote mobile devices, remote locking of the remote mobile devices, automatic OS or application update or patching of the remote mobile device, and/or remote wipe of the remote mobile devices, in some examples. The UEM server 412 may also govern device access to the enterprise resources 410 by the remote mobile devices. The remote mobile devices include the computing device 402 in this example.

The computing device 402 may include a personal profile 414 and a work profile 416. The personal profile 414 may have certain applications 418 and data 420 stored and operable within the personal space on the computing device 402 and accessible to a user when logged into the personal profile 414. Likewise, the work profile 414 may have certain applications 422 and data 424 stored and operable within the work space on the computing device 402 and accessible to a user when logged into the work profile 416.

The UEM server 412 and its device policies may govern the applications 422 available from within the work profile 416 on the computing device 402. To this end, the UEM server 412 may obtain information from the computing device 402 regarding the applications 422 installed within the work profile 416. In some examples, the work profile 416 may include a reporting agent 430 that automatically, periodically or on request, sends information to the UEM server 412 regarding the applications 422 installed in the work profile 416. This information enables the UEM server 412 to assess compliance with device policies and take action if non-compliance is detected.

In some example implementations, some of the applications 418 within the personal profile 414 may be associated with the enterprise in that they are configured to be managed by the UEM server 412, despite being installed and operating within the personal space. In one example, some of the applications 418 may be built using a software development library that incorporates functions that cause the applications 418 to route communications and, in particular, API calls, through the enterprise network 404. The applications 418 may be configured to establish a VPN (virtual private network) between the computing device 402 and the enterprise network 404 for secure communications. The applications 418 may have access to UEM enterprise resources 410. The UEM server 412 may, thus, be able to govern operation and communications of the applications 418 that are so configured. A reporting agent 432 may be present within the personal profile 414 to relay communications or data to the UEM server 412 regarding one or more of the applications 418. Although illustrated separately for clarity of explanation, it will be appreciated that the functions of the reporting agent 432 may be incorporated within applications 418 configured to direct API calls to the enterprise network 404.

In accordance with one aspect of the present application, the UEM server 412 or another server within the enterprise network 404 may be configured to determine whether the computing device 402 has likely been compromised through assessing the file tree structure of the computing device 402. In one example, the UEM server 412 may obtain file tree structure information for the work profile 416 of the computing device 402. The file tree structure information may be provided by the reporting agent 430 in some examples. The UEM server 412 may evaluate the file tree structure information based on a device model and/or heuristic logic rules to identify whether the file tree structure includes any indicia of a compromised device.

In another example, the UEM server 412 may obtain file tree structure information for the personal profile 414 of the computing device 402. The file tree structure information may be provided by the reporting agent 432 in some examples. The UEM server 412 may evaluate the file tree structure information based on a device model and/or heuristic logic rules to identify whether the file tree structure includes any indicia of a compromised device.

In a further example, the reporting agent 430 may obtain file tree structure information for the work profile 416 of the computing device 402. The reporting agent 430 may evaluate the file tree structure information based on a device model and/or heuristic logic rules to identify whether the file tree structure includes any indicia of a compromised device. The device model and/or heuristic logic rules may be provided to the reporting agent 430 by the UEM server 412 in some implementations. In some cases, the reporting agent 430 may report results of the evaluation to the UEM server 412 for further action by the UEM server 412 based on the determination as to whether the computing device 402 is likely compromised.

In yet a further example, the reporting agent 432 may obtain file tree structure information for the personal profile 414 of the computing device 402. The reporting agent 432 may evaluate the file tree structure information based on a device model and/or heuristic logic rules to identify whether the file tree structure includes any indicia of a compromised device. The device model and/or heuristic logic rules may be provided to the reporting agent 432 by the UEM server 412 in some implementations. In some cases, the reporting agent 432 may report results of the evaluation to the UEM server 412 for further action by the UEM server 412 based on the determination as to whether the computing device 402 is likely compromised.

Figure 5:
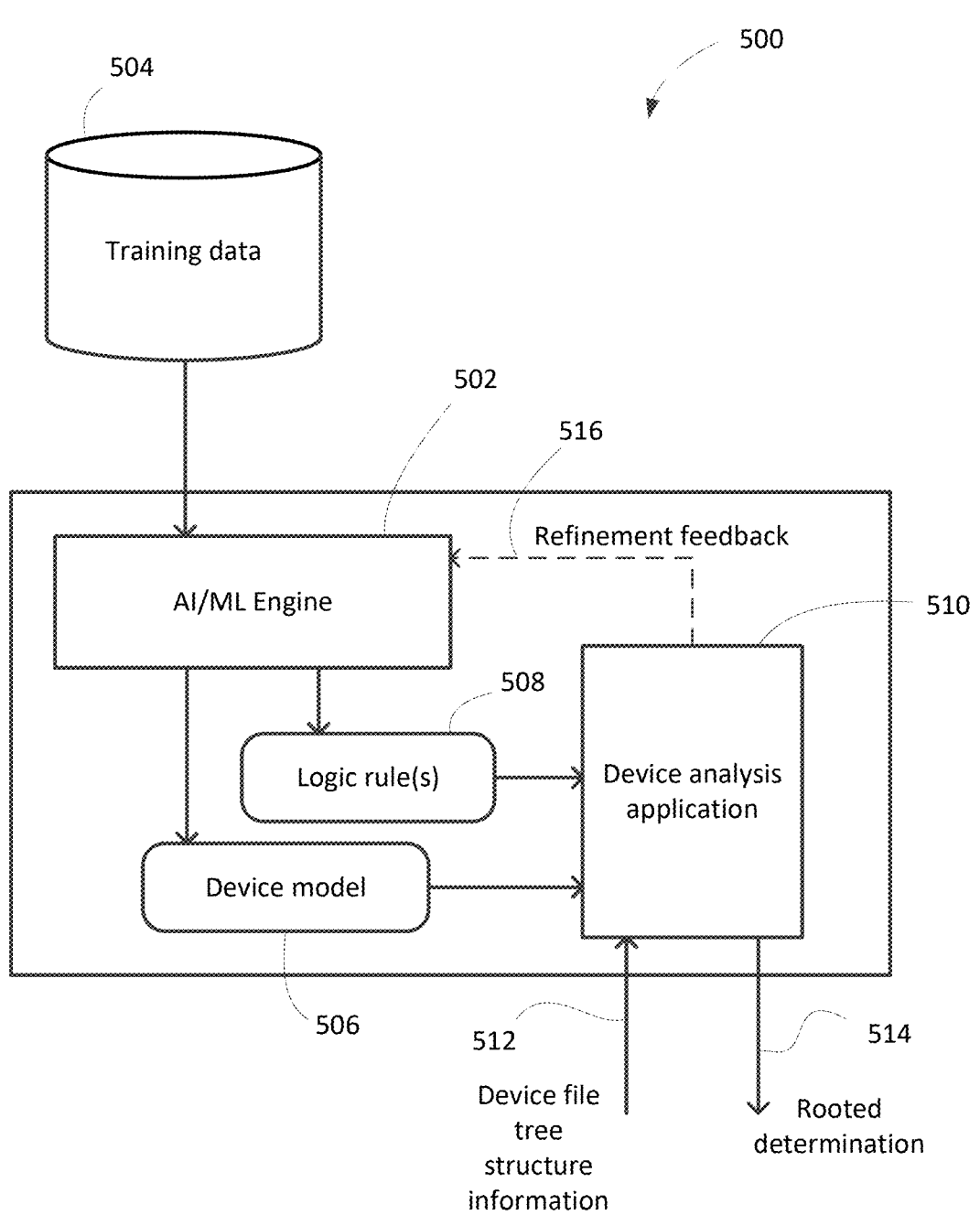
FIG. 5 shows an example of a server.

Reference is now also made to FIG. 5, which illustrates a server 500. The server 500, in some examples, may be configured to determine whether a computing device has likely been compromised. The server 500 may, in some instances, include an artificial intelligence or machine learning engine 502 that is capable of receiving training data 504 in the form of file tree structure information from a large number of devices categorized as compromised or not compromised and to output a device model 506 and/or a logic rule(s) 508 that identifies at least one indicia of a compromised device. The indicia relates to an aspect of file tree structure. In some examples, the indicia may be presence of a specific file or folder, a permission setting on a certain file or folder, a number of files overall or within a certain folder, the size of one or more files in a certain folder, or the presence/visibility of certain files or folders. In these examples, references to files or folders may include threads or other active processes, such as those visible in the Android™ operating system in the virtual/proc filesystem.

In one example, an indicia of a compromised device may be that folders and/or files within privileged space in memory are accessible or may be edited or otherwise manipulated. In a non-compromised device such folders or files may be excluded from the file tree structure information or may be visible but may have restricted permissions that prevent reading, copying, editing, and/or deleting. If one or more such files within privileged memory space are visible and/or have permissions associated that give greater user access than would otherwise be expected, it may be an indicia of a compromised device.

In one example implementation, a first training set may be populated by file tree structures for known non-compromised devices. With a plurality of file tree structure from a large number of non-compromised devices, the machine learning engine 502 may develop a baseline model for the file tree structure of a non-compromised device. This baseline model may focus on the features, e.g. files, folders, hierarchies, permissions, that are consistent across non-compromised devices despite individual variation in applications, user data, usage, etc. The machine learning engine 502 may then be provided with a second training set populated by file tree structures for known compromised devices. From this data, the machine learning engine 502 may begin to recognize one or more indicia within the file tree structures of the compromised devices versus its baseline model for a non-compromised device that is indicative of a compromised device.

In some cases, the identified indicia may be provided with an associated weighting by the machine learning engine 502 indicating the predictive power of that indicia. For example, some indicia may be more or less consistently found in compromised devices versus non-compromised devices; the weighting may reflect the greater or lesser degree to which that indicia is correlated with identification of a compromised device. In another example, weighting may be adjusted based on sub-combinations of indicia. That is, detection of a first indicia or a second indicia may only be somewhat correlated to identification of a compromised device, but detection of both the first and second indicia together in one file tree structure may be strongly indicative of a compromised device.

In some cases, the indicia may be further associated with a particular type or category of compromised device. The indicia may be associated with a specific malware or virus, for example; or the indicia may be associated with a known rootkit or a specific attack vector. Separate indicia both associated with the same type of attack may be strongly indicative of the likelihood that such an attack has been detected.

In some implementations, the server 500 may not include a true machine learning engine, and the logic rules 508 and/or device model 506 may be generated from the training data 504 using some other heuristic analysis process.

The server 500 may include a device analysis application 510 that, when executed, uses the device model 506 and/or the logic rules 508 to assess whether a subject computing device is likely compromised. The device analysis application 510 may receive file tree structure information 512 from the subject computing device. The file tree structure information 512 may be a portion of the file tree structure of the file system in the subject computing device. The file tree structure information may be associated with a specific user profile on the subject computing device, such as a personal profile or a work profile. It may, in some cases, include all files and folder visible from within that specific user profile. The file tree structure information 512 may include information regarding the hierarchy of folders or directories and the files contained in those folders/directories. In some cases, the hierarchy is specified through a listing of files and folders with their pathnames providing details regarding parent folder(s). It may further include metadata for the files and the folders/directories. The metadata may include, for example, file size, date of creation, date of modification, permissions data, etc.

The device analysis application 510 may evaluate the received file tree structure information 512 based on the device model 506 and/or the logic rules 508. To the extent that the device model 506 and/or the logic rules 508 identify one or more indicia of a compromised device, then device analysis application 510 may determine whether the received file tree structure information 512 includes or exhibits the one or more indicia. The indicia may have associated weights indicative of their predictive association with a compromised device in some implementations. In one example, the device model 506 provides features of one or more file tree structures correlated with non-compromised devices, and the device analysis application 510 compares the device model 506 to the file tree structure information to identify if there is a deviation indicative of a compromised device. In another example, the device model 506 provides features of one or more file tree structures correlated with compromised devices, and the device analysis application 510 compares the device model 506 to the file tree structure information to identify if there is a match with one or more indicia of a compromised device. In a further example, the logic rules 508 may specify one or more indicia of a compromised device and the device analysis application 510 may determine whether the file tree structure information features the one or more indicia specified in the logic rules 508.

The device analysis application 510 may output a result of the determination as indicated by rooted determination 514. The result may be output to the server 500 to cause a notification or a further action. The notification may alert an administrator, the computing device, or another device of the determination that the computing device is compromised, is not compromised, or might be compromised (indeterminate). The result may cause the server 500 to take an action with regard to the computing device, such as locking the device, wiping the device, denying access to the enterprise resources, or logging the result in memory on the server, as examples.

In some implementations, the server 500 may implement a feedback mechanism to refine or modify the device model 506 and/or logic rules 508 as a result of determinations made by the device analysis application 510. A model refinement feedback 516 path may supply determination information to the machine learning engine 502 to refine its output. In some instances, the determination information may include the determination made by the device analysis application 510 and the received file tree structure information 512. In some cases the determination information may be approved or authenticated by an administrator prior to being sent as model refinement feedback 516.

It will be appreciated that in some implementations some or all the functions of the device analysis application 510 may be implemented on the computing device by one or both of the reporting agents 430, 432 (FIG. 4). The server 500 may provide the reporting agents 430, 432 with the device model 506 and/or the logic rules 508 and results may be reported back to the server 500 in such embodiments.

Figure 6:
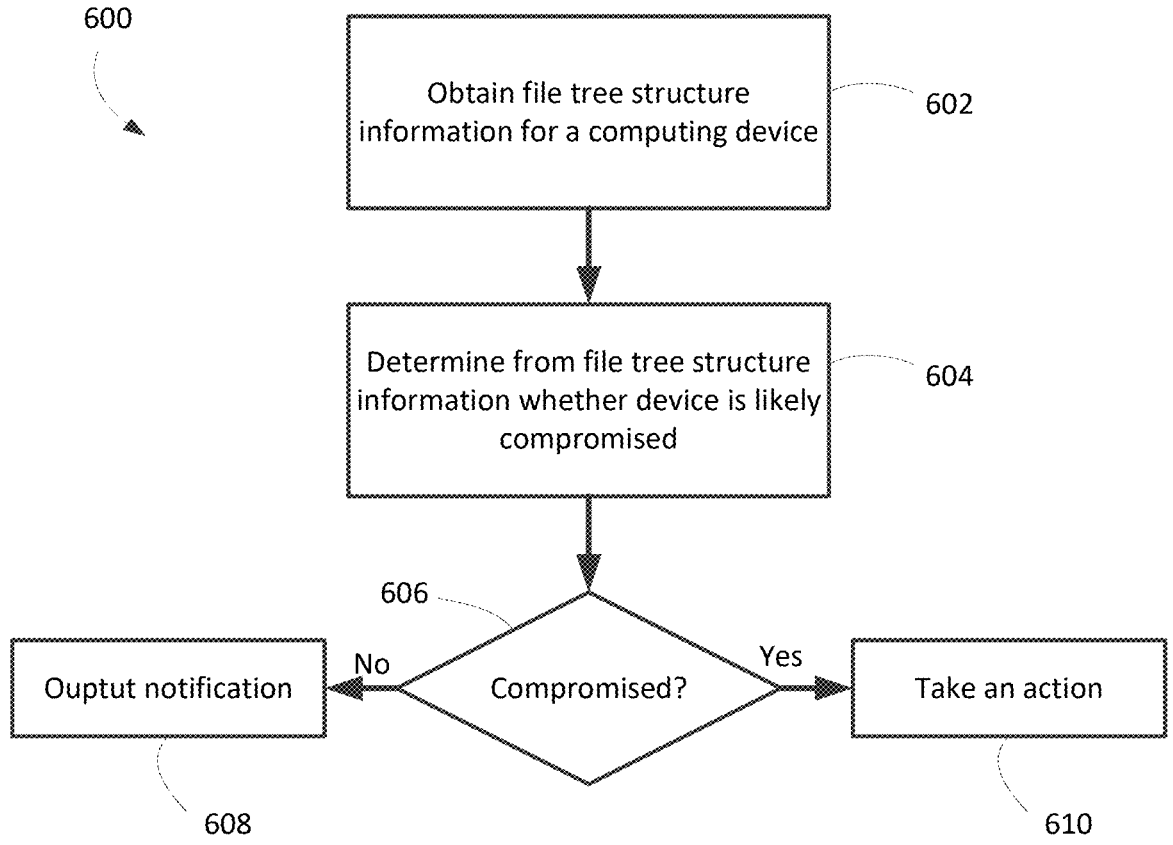
FIG. 6 shows, in flowchart form, one example method for determining whether a computing device has been compromised.

Reference will now be made to FIG. 6, which shows, in flowchart form, one example method 600 for determining whether a computing device has been compromised. The method 600 may be implemented through processor-executable instructions that, when executed by one or more processors, cause the processors to carry out the described operations. In some implementations, the method 600 is implemented as a server, such as server 500 (FIG. 5) or MDM server 412 (FIG. 4). In some implementations, the method 600 is implemented on the computing device being analyzed and results are reported to a remote server separate from the computing device. The computing device may include a reporting agent or other software module operating partly under control of the remote server for the purpose of carrying out the analysis.

The method 600 includes operation 602 in which file tree structure information for the computing device is obtained. The file tree structure information may include information regarding the files and folder/directories of a file system in the computing device. The file tree structure information may be restricted to file tree structure information accessible based on a specific personal or work profile on the computing device. In particular, the applicable profile may feature a set of permissions or authorizations that enable visibility to a subset of the file tree structure information on the computing device.

The method 600 then includes determining, from the file tree structure information, whether the device is likely compromised in operation 604. As described above, the determination may be based on a device model and/or logic rules developed using training data and machine learning algorithms in some implementations. The determination may include a confidence weight as to the likelihood that the device is compromised in some implementations. In some examples, the result may be binary: the device is compromised or the device is not compromised. In some implementations, the result may also be indeterminate, i.e. there is insufficient confidence to determine from the file tree structure information whether the computing device is compromised or not compromised. As described above, the determination may be based on identifying indicia of a compromised device within the obtained file tree structure information.

As result of the determination, as indicated by operation 606, a notification may be output in operation 608 or an action may be taken in operation 610.

Figure 7:
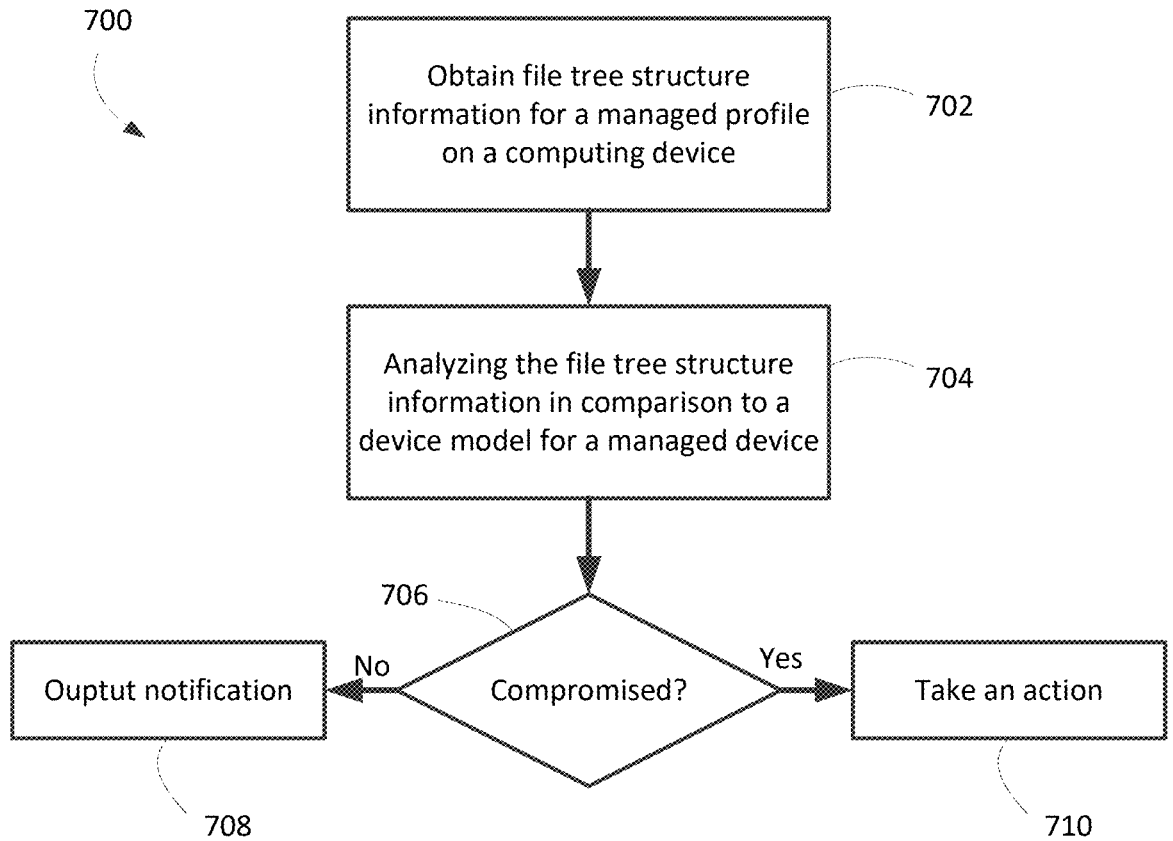
FIG. 7 shows, in flowchart form, one example method for determining whether a computing device has been compromised via a managed profile on the computing device.

Reference will now be made to FIG. 7, which shows, in flowchart form, one example method 700 for determining whether a computing device has been compromised via a managed profile on the computing device. The method 700 may be implemented through processor-executable instructions that, when executed by one or more processors, cause the processors to carry out the described operations. In some implementations, the method 700 is implemented on the computing device being analyzed and results are reported to a remote server separate from the computing device. The computing device may include a reporting agent or other software module operating partly under control of the remote server for the purpose of carrying out the analysis. In some other implementations, the method 700 is implemented on the remote server based on file tree structure information provided to the remote server by a reporting agent operating within the managed profile on the computing device.

The method 700 includes operation 702 in which file tree structure information for the managed profile of the computing device is obtained. The file tree structure information may include information regarding the files and folder/directories of a file system visible from within the managed profile on the computing device. The reporting agent operating within the managed profile may obtain the file tree structure information based on an operating system command to generate a list of all visible files and/or folders with their pathnames and their associated permissions, for example.

The method 700 then includes determining, from the file tree structure information, whether the device is likely compromised in operation 704. As described above, the determination may be based on a device model and/or logic rules developed using training data and machine learning algorithms in some implementations. The determination may include a confidence weight as to the likelihood that the device is compromised in some implementations. In some examples, the result may be binary: the device is compromised or the device is not compromised. In some other examples the result may be "compromised", "not compromised" or "indeterminate". As described above, the determination may be based on identifying one or more indicia of a compromised device within the obtained file tree structure information.

In this example, one illustrative indicia of a compromised managed device may include visibility of a file or folder not expected to be visible from within the managed profile; for instance, a file or folder for which the managed profile lacks associated permissions to view. In some cases the file or folder may be a file or folder in the unmanaged space, i.e. a file or folder owned by or controlled by the unmanaged profile. This may include a file or folder in a sub-directory of the file tree structure assigned to the unmanaged profile and for which the managed profile lacks permissions to view.

In another example, a non-compromised device may characterized by the file tree structure, or a particular portion of the file tree structure, appearing to be the same when viewed from both the managed and unmanaged profiles. One indicia of a compromised device may be that the portion of the file tree structure is different when observed from the managed profile versus the unmanaged profile.

In yet another example, in the case of a managed device, the remote server may have access to file tree structure information from a large number of managed devices. The large number of managed devices may be associated with a specific enterprise, for example. The fleet of managed devices may have similar file tree structure data. In some cases, a portion of the file tree structure data may be expected to be consistent across the managed devices. Detection of a deviation in one computing device that is not reflected in other computing devices in the same fleet may be indicative of a compromised device. As an illustration, a portion of the file tree structure may be expected to have a certain number of files or folders, or may be expected to be of a certain size, and a change in that characteristic of the file tree structure may be indicative of a potentially compromised device if that same change is not detected, after a period of time, in other similar devices of the fleet of managed devices.

As result of the determination, as indicated by operation 706, a notification may be output in operation 708 or an action may be taken in operation 710.

Figure 8:
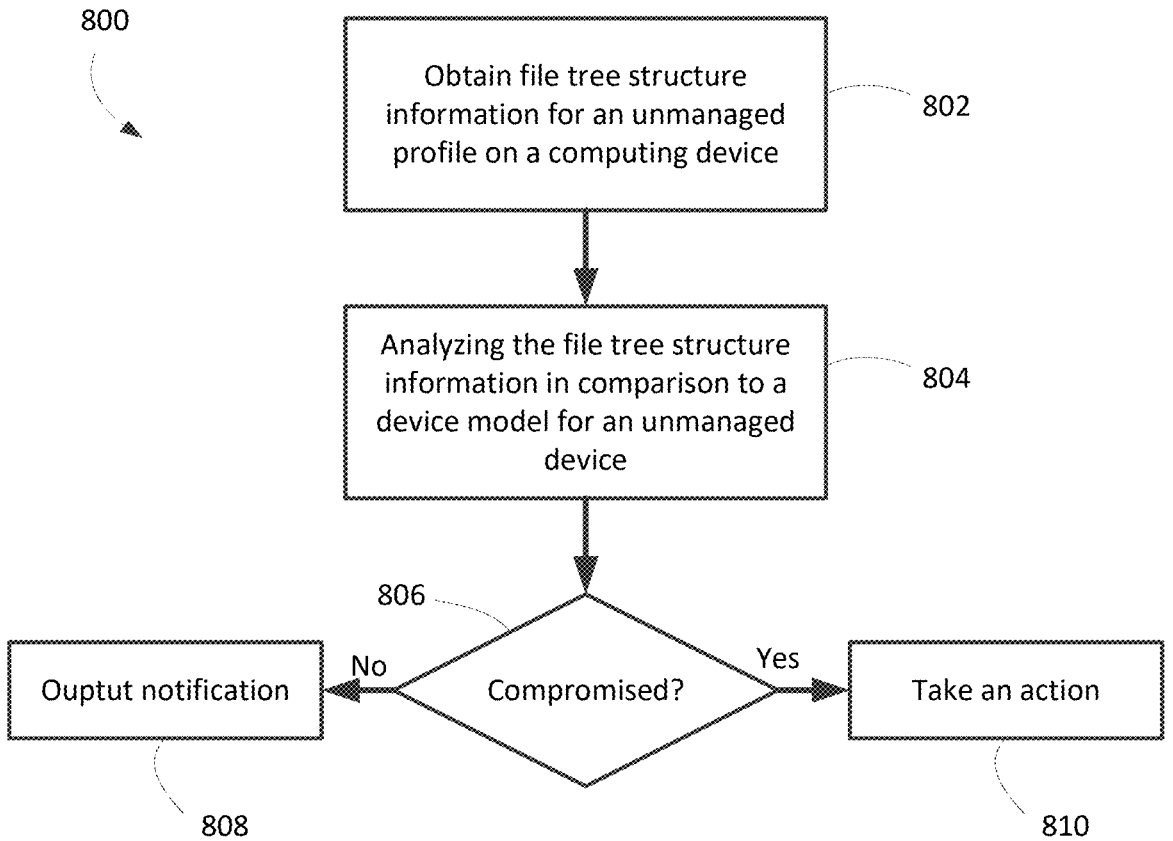
FIG. 8 shows, in flowchart form, one example method for determining whether a computing device has been compromised via an unmanaged profile on the computing device.

Reference will now be made to FIG. 8, which shows, in flowchart form, one example method 800 for determining whether a computing device has been compromised via an unmanaged profile on the computing device. The method 800 may be implemented through processor-executable instructions that, when executed by one or more processors, cause the processors to carry out the described operations. In some implementations, the method 800 is implemented on the computing device being analyzed and results are reported to a remote server separate from the computing device. The computing device may include a reporting agent or other software module for the purpose of carrying out the analysis. In some other implementations, the method 800 is implemented on the remote server based on file tree structure information provided to the remote server by a reporting agent operating within the unmanaged profile on the computing device.

The method 800 includes operation 802 in which file tree structure information for the unmanaged profile of the computing device is obtained. The file tree structure information may include information regarding the files and folder/directories of a file system visible from within the unmanaged profile on the computing device. The reporting agent operating within the unmanaged profile may obtain the file tree structure information based on an operating system command to generate a list of all visible files and/or folders with their pathnames and their associated permissions, for example.

The method 800 then includes determining, from the file tree structure information, whether the device is likely compromised in operation 804. As described above, the determination may be based on a device model and/or logic rules developed using training data and machine learning algorithms in some implementations. The determination may include a confidence weight as to the likelihood that the device is compromised in some implementations. In some examples, the result may be binary: the device is compromised or the device is not compromised. In some other examples the result may be "compromised", "not compromised" or "indeterminate". As described above, the determination may be based on identifying one or more indicia of a compromised device within the obtained file tree structure information.

In this example, one illustrative indicia of a compromised unmanaged device may include visibility of a file or folder not expected to be visible from within the unmanaged profile; for instance, a file or folder for which the unmanaged profile lacks associated permissions to view. In some cases the file or folder may be a file or folder in the managed space, i.e. a file or folder within or associated with a work profile. This may include a file or folder in a sub-directory of the file tree structure assigned to the managed profile and for which the unmanaged profile lacks permissions to view.

As result of the determination, as indicated by operation 706, a notification may be output in operation 708 or an action may be taken in operation 710.

Figure 9:
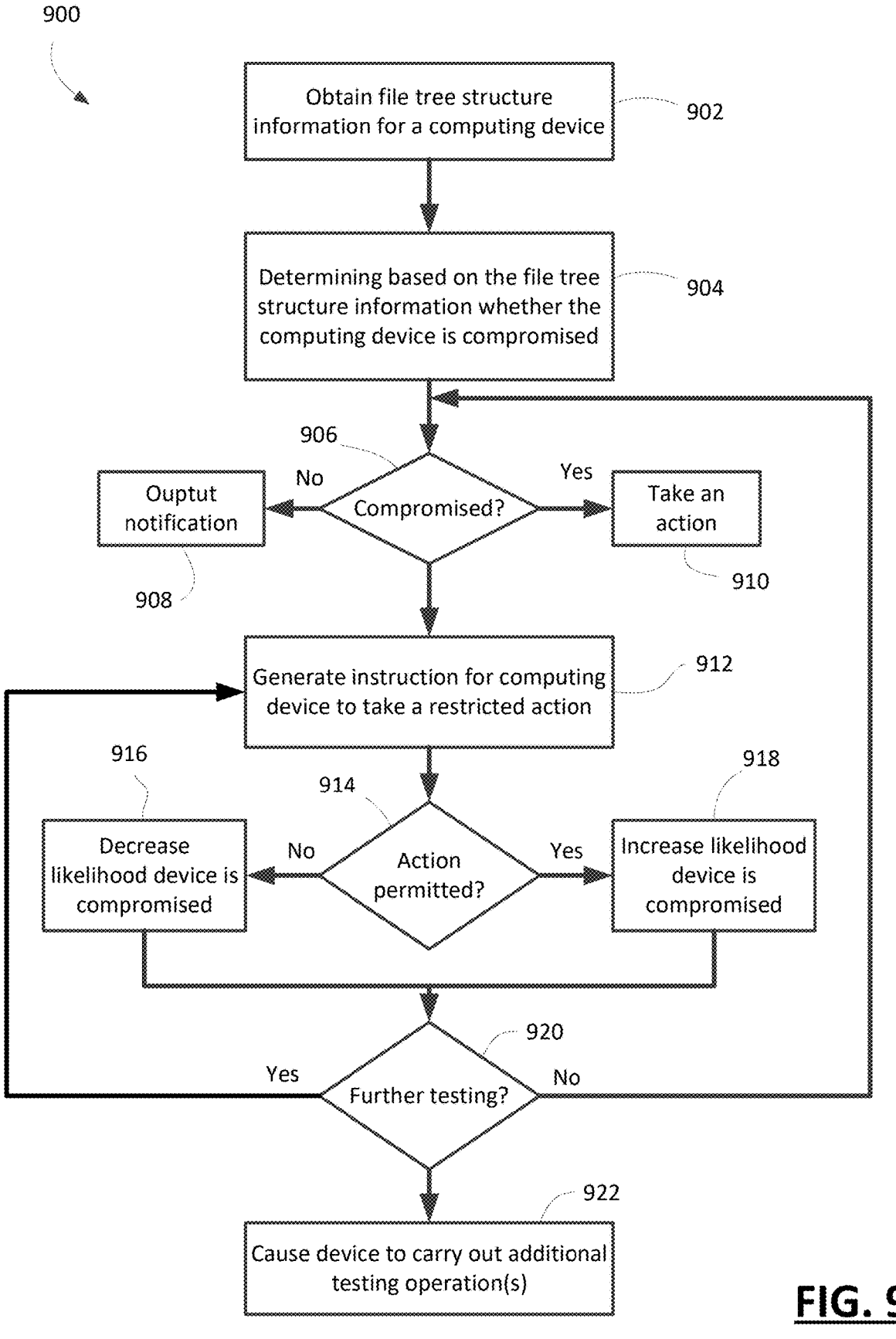
FIG. 9 shows, in flowchart form, a further example method for determining whether a computing device has been compromised based on using a restricted action.

Reference is now made to FIG. 9, which shows, in flowchart form, another example method 900 for determining whether a computing device has been compromised. The method 900 may be implemented through processor-executable instructions that, when executed by one or more processors, cause the processors to carry out the described operations. In some implementations, the method 900 is implemented on the computing device being analyzed and results are reported to a remote server separate from the computing device. The computing device may include a reporting agent or other software module for the purpose of carrying out the analysis. In some other implementations, the method 900 is implemented partly on the remote server based on file tree structure information provided to the remote server by a reporting agent operating on the computing device. The reporting agent may be within a managed profile or an unmanaged profile. The reporting agent may carry out operations or functions in response to commands from the remote server in some cases. Example operations or functions are described below.

In operation 902, file tree structure information is obtained. In operation 904, the file tree structure information is analyzed to determine whether the computing device is compromised. As indicated by operation 906, if the determination is that the computing device is not compromised, then in operation 908 a notification may be output to that effect. The output of the notification may include recording the "not compromised" determination in memory or in an outgoing message to a third party device, such as an administrator device. If the determination is that the computing device is compromised, then in operation 910 an action may be taken. Example actions may include outputting a notification indicating that the device is compromised, locking the device, wiping the device, blocking device access to enterprise network resources, or other such actions, including combinations or sub-combinations of such actions. As mentioned above, the indicia of "compromised" may include weights and the determination of compromised or not-compromised may have associated certainty or probabilities as determined by the weighted indicia. Above certain thresholds, the certainty or probability may result in a determination of "compromised" or "not compromised", but below those thresholds the determination may be ambiguous or indefinite.

If the determination in operation 906 is that the status of the computing device is indeterminate, i.e. "might be" compromised, then the method 900 may include further operations to attempt to resolve the ambiguity and come to a more definitive determination. In operation 912, for example, an instruction may be generated to cause the computing device to take a restricted action. The instruction may be generated by a remote server and passed to a reporting agent on the computing device, or may be generated by the reporting agent. The instruction may be generated by the reporting agent based on a message or command from the remote server. The instruction may be an operating system instruction send to the operating system, e.g. the kernel, using whatever instruction mechanism is applicable for a given operating system.

The instruction may include an instruction to take a restricted action, which may include actions such as moving a file, copying a file, writing to a memory space, deleting a file, creating a new file or folder, or other file-system manipulation actions. The actions may be "restricted" in the sense that the reporting agent should not be able to cause the action to occur, for example due to a lack of permissions. For example, the file or folder may be one for which the reporting agent lacks sufficient credentials to manipulate in the manner specified in the instructions. As an illustration, a reporting agent resident in the work profile should not be able to copy a file resident in a folder specific to the personal profile, for example a data or media folder within a user-specific folder associated with the personal profile. As another illustration, a reporting agent resident in the work profile should not be able to write to a folder specific to the personal profile, for example storing a file or document within a user-specific folder associated with the personal profile.

In operation 914, the reporting agent may evaluate whether the requested action specified by the instruction was permitted by the computing device. In other words, whether the restricted action occurred. If not, then the probability or likelihood that the device is compromised may be lower. An associated metric, such as a probability value may be reduced accordingly, as indicated by operation 916. If the restriction action was permitted to occur, then the likelihood that the device is compromised may be higher. The associated metric, i.e. a parameter indicating the probability the device is compromised, may be increased in operation 918.

In some cases, the method 900 may include multiple tests through trying multiple restricted actions. If so, then in operation 920 if further testing is to occur, then the method 900 returns to operation 912 to try another restricted action. If not or if no further tests are available or desirable or needed, then the method 900 returns to operation 906 to evaluate whether it is now possible to determine that the device is either compromised or not compromised. The adjustments to the associated metric, e.g. a probability parameter, as a result of testing the restricted action may now have resulted in a probability parameter that exceeds a threshold one way or another, i.e. indicating with sufficient confidence that the device is either compromised or not compromised.

The method 900 may alternatively or additionally include causing the computing device to carry out additional testing operations, as indicated by operation 922. Examples include more "expensive" operations that are too costly to imposed on all devices, but may be merited once a device has been identified as "might be" compromised. For example, an operation may include causing the device to hash a set of system libraries and comparing them to a hash of known/expected system libraries. Another example operation may include causing the device to run a process with an expected run-time and evaluating whether the run-time deviates by more than a threshold amount and/or whether tasks are schedule and maintained in an expected manner. A further example operation may include running through a list of protected system calls to see if anything is exposed. Yet a further example is investigating system settings to determine whether items have been modified in such a way as may be required to gain root access (as an example, changes to developer options). The additional testing operations may include one or more of these example operations in some cases.

It will be appreciated that the various methods described above are presented in flowchart form to show a sequence of operations for ease of illustration and discussion, but that in some implementations a different sequence of operations may be used, additional operations may be included, and/or some operations shown sequentially may occur simultaneously or in parallel, without changing the substance of the processes.

The above-described embodiments focus on methods and systems for identifying potentially compromised devices based upon file tree structure. In some cases, the determination as to whether a device is potentially compromised may take into account additional factors as well the file tree structure. For example, the machine-learning based file tree structure model used to identify potential indicia of a compromised device may be supplemented by other device model, which may also be developed using machine-learning, that seek other indicia of a potentially compromised device. Collectively, these device models may be considered a "meta model" of compromised devices. The combined results of evaluating two or more of these models may be used to determine whether a device is compromised; or one of the models may incorporate indicia based on file tree structure and indicia based on some other detectable anomaly that tends to correlate to a compromised device.

It may also be appreciated that in some implementations a layered approach may be taken to determining whether a device is likely compromised. For example, in one case more than one reporting agent may be present within a profile, whether a managed profile or an unmanaged profile. For instance, reporting agent functionality may be built into enterprise-managed applications that have been installed within a profile. That reporting agent functionality present within multiple applications may result in multiple views of the file tree structure from each reporting agent, which should match. An evaluation may be made at the device or may be made at the remote server, or may be made at both. Each application may make a determination as to whether a device is likely compromised based on the file tree structure information to which is has access, and a remote server may receive that information and confirm and/or compare those determinations to make an overall determination.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A computer-implemented method of determining whether security of a mobile device is compromised, the method comprising:
   determining that the mobile device might be compromised;
   based on the determination that the mobile device might be compromised, carrying out a testing operation that comprises instructing the mobile device to run a process with an expected run-time;
   comparing an actual time the process runs with the expected run-time;
   determining that the security of the mobile device is compromised, in response to determining that the actual time the process runs deviates from the expected run time by more than a threshold; and
   based on the determination that the security of the mobile device is compromised, taking an action.

2. The computer-implemented method of claim 1, further comprising:
   obtaining file tree structure information for the mobile device, wherein the file tree structure information details at least a portion of a tree-based structure of folders and files in a portion of memory; and
   analyzing the file tree structure information to determine that the mobile device might be compromised.

3. The computer-implemented method of claim 1, further comprising, in response to the determination that the mobile device might be compromised, instructing the mobile device to execute an operation carried out from within a first user profile included in the mobile device with respect to a file or folder associated with a second user profile included in the mobile device that should not be able to be carried out from within the first user profile.

4. The computer-implemented method of claim 3, wherein the determining that the mobile device is compromised comprises determining that the operation occurs on the mobile device.

5. The computer-implemented method of claim 4, wherein the operation comprises running through a list of protected systems calls.

6. The computer-implemented method of claim 1, further comprising, in response to the determination that the mobile device might be compromised, instructing the mobile device to evaluate whether tasks are scheduled and maintained in an expected manner.

7. The computer-implemented method of claim 6, wherein the instructing the mobile device to investigate the system settings to determine whether items have been modified in a way that is required to gain root access comprises determining whether developer options have been changed.

8. The computer-implemented method of claim 1, further comprising, in response to the determination that the mobile device might be compromised, instructing the mobile device to investigate system settings to determine whether items have been modified in a way that is required to gain root access.

9. The computer-implemented method of claim 1, further comprising instructing the mobile device to automatically cause input of a command line instruction at the mobile device.

10. The method of claim 1, wherein the determining that the security of the mobile device is compromised comprises determining that the mobile device is infected with malware, spyware, or a virus, and wherein the action comprises locking the mobile device, wiping the mobile device, or denying access to the mobile device.

11. The method of claim 1, wherein the threshold is a threshold amount of time.

12. A computing device comprising:

a processor;

a memory storing processor-executable instructions that, when executed by the processor, cause the processor to:

determine that the mobile device might be compromised;

based on the determination that the mobile device might be compromised, carry out a testing operation that comprises instructing the mobile device to run a process with an expected run-time;

comparing an actual time the process runs with the expected run-time;

determine that security of the mobile device is compromised, in response to determining that the actual time the process runs deviates from the expected run time by more than a threshold; and based on the determination that the security of the mobile device has been compromised, take an action.

13. The computing device of claim 12, wherein the instructions, when executed, further cause the processor to:

obtain file tree structure information for the mobile device, wherein the file tree structure information details at least a portion of a tree-based structure of folders and files in a portion of the memory; and analyze the file tree structure information to determine that the mobile device might be compromised.

14. The computing device of claim 12, wherein the instructions, when executed, further cause the processor to, in response to the determination that the mobile device might be compromised, execute an operation carried out from within a first user profile included in the mobile device with respect to a file or folder associated with a second user profile included in the mobile device that should not be able to be carried out from within the first user profile.

15. The computing device of claim 14, wherein the determining that the mobile device is compromised comprises determining that the operation occurs on the mobile device.

16. The computing device of claim 15, wherein the operation comprises running through a list of protected systems calls.

17. The computing device of claim 12, wherein the instructions, when executed, further cause the processor to, in response to the determination that the mobile device might be compromised, instructing the mobile device to evaluate whether tasks are scheduled and maintained in an expected manner.

18. The computing device of claim 12, wherein the instructions, when executed, further cause the processor to, in response to the determination that the mobile device might be compromised, instructing the mobile device to investigate system settings to determine whether items have been modified in a way that is required to gain root access.

19. The computing device of claim 18, wherein the instructing the mobile device to investigate the system settings to determine whether items have been modified in a way that is required to gain root access comprises determining whether developer options have been changed.

20. A non-transitory computer-readable storage medium storing instructions that, when executed by a processor of a mobile device, cause the processor to:

determine that the mobile device might be compromised;

based on the determination that the mobile device might be compromised, carry out a testing operation that comprises instructing the mobile device to run a process with an expected run-time;

compare an actual time the process runs with the expected run-time;

determine that security of the mobile device is compromised, in response to determining that the actual time the process runs deviates from the expected run time by more than a threshold; and based on the determination that the security of the mobile device is compromised, take an action.

\*  \*  \*  \*  \*